Sept. 3, 1935. R. C. JACOBS 2,013,608
TOGGLE DEVICE
Filed Sept. 4, 1934
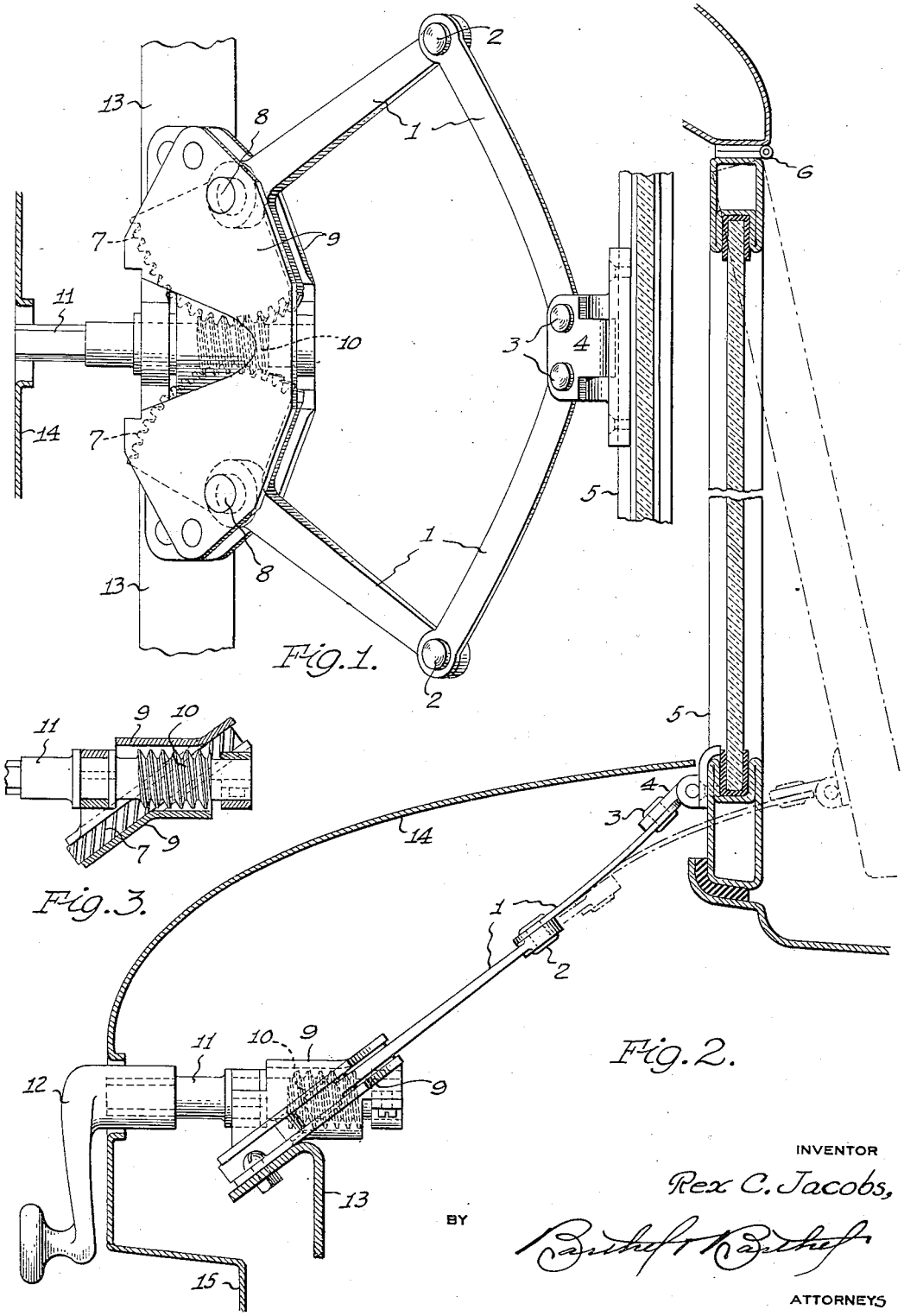

Patented Sept. 3, 1935

2,013,608

UNITED STATES PATENT OFFICE 2,013,608

TOGGLE DEVICE

Rex C. Jacobs, Detroit, Mich., assignor to F. L. Jacobs Company, Detroit, Mich., a corporation of Michigan Application September 4, 1934, Serial No. 742,576

6 Claims. (Cl. 296—84)

This invention relates to toggle devices and has for its object to provide an improved device of this type particularly suitable for use in opening and closing vehicle windshields.

A principal object is to provide toggle arms adapted for traversal through arcs angularly disposed to the arc of opening and closing of the windshield, and to provide a worm gear for actuating the arms.

A further object is to provide a housing for the worm gear and for helical gears integral with the toggle arms, the housing constituting sturdy means for fixing the axes of the several gears in order that proper meshing, ease of operation and long life will be assured.

Another object is to provide a cowl bar for residence under the vehicle instrument panel which will form a rigid support for the gear housing and which will therefore maintain the angle of the toggle arms in the most favorable operating position over long periods of time.

Other objects and advantages will become hereinafter more fully apparent as reference is had to the accompanying drawing wherein my invention is illustrated and in which, Figure 1 is a top plan view of my toggle device shown attached to a windshield and mounted on a cowl bar;

Fig. 2 is a vertical section through a windshield and instrument panel showing my improved toggle in side elevation, and Fig. 3 is a detail showing the gear housing in section.

More particularly, 1 indicates two toggle arms hinged at points 2 intermediate their ends and pivotally attached at their outer ends 3 to a bracket 4 rigidly secured to a windshield frame 5. The windshield frame is hinged at 6 to swing through an arc transverse to the arc of swing of the arms 1.

Integral with the inner ends of the arms 1 are gear teeth 7. Pins 8 integral with the arms 1 are journalled in a housing 9 and retain the gear teeth 7 in fixed rotative relation with a worm gear 10 supported at both ends in a central opening through the housing 9. The mid points of the pins 8 are substantially diametrically opposed to each other with respect to the worm 10. An extension 11 of the worm 10 is formed to receive a handle 12 for manual rotation thereof whereby the arms 1 are actuated.

The housing 9 as illustrated in all three figures is so formed that the gear extension 11 extends substantially horizontally while the journal pins 8 maintain the arms 1 at the most favorable angles for connection to the bracket 4, when secured to the cowl bar 13. This cowl bar 13 forms a rigid support for the housing 9 so that in order to compensate for the differential plane of the arcs of arms 1 and the arc of the frame 5, the arms 1 must flex, as illustrated in Figure 2.

An advantage of the use of a worm 10 is that the windshield will remain at any agle to which it may be opened and hence requires no additional means for retaining the shield in any desired position.

The panel 14 is the instrument panel which extends from the bottom rail of the frame 5 to a depression or inset portion 15 in which the instruments are mounted. The handle 12 is inserted through this panel 14 and resides, preferably, at a convenient height midway between the sides of the instrument panel.

What I claim is:—

1. A toggle device comprising a plurality of arms each hinged intermediate its length, a means to be actuated by said arms pivotally connected to one end thereof, gear teeth integral with the other ends of said arms, a gear housing for said gear teeth, said arms being pivotally mounted in said housing adjacent said gear teeth and a worm gear journalled in said housing in mesh with said gear teeth, said worm gear having an axis which traverses the plane containing both axes of rotation of said gear teeth at an obtuse acute angle.

2. In a toggle device, two arms hinged intermediate the ends thereof and adapted for pivotal attachment at one end to a means to be actuated thereby, gear teeth on the other end of each of said arms, a housing for said gear teeth, said arms being journalled in said housing near said gear teeth, a worm gear journalled in said housing and in mesh with said gear teeth, said worm gear having its axis disposed at an acute obtuse angle to the axes of rotation of said gear teeth, and manual means for rotating said worm gear.

3. In combination, a windshield frame adapted to swing about hinges along the top thereof to open and closed position, an instrument panel extending downwardly from the bottom rail of said frame, a cowl bar housed by said instrument panel, a housing secured to said cowl panel and having a central opening therethrough, a worm gear journalled at each end in said opening and having a tool receiving end portion projecting toward said instrument panel, toggle arms each having helical gear teeth pivotally mounted in said housing for meshing with the teeth of said worm gear, said arms being pivotally connected with the bottom rail of said frame for opening and closing thereof, said cowl bar comprising a rigid support for said housing, said arms being adapted to flex during opening and closing of the windshield.

4. In a toggle device, toggle arms hinged intermediate the length thereof, means pivotally attached to the outer ends of said arms adapted to swing through a fixed arc under actuation of said arms, gear teeth integral with the inner ends of said arms, fixed journals about which said gear teeth rotate, and gear means for causing rotation of said gear teeth to actuate said arms and said means, said arms being adapted to flex during actuation of said means according to the angle through which said means is actuated.

5. In a toggle device, toggle arms hinged intermediate the length thereof and adapted to approach and recede from each other at their hinges, a framework pivotally attached to the outer ends of said arms adapted to swing to open and closed position through a fixed arc transverse to the arcuate movement of said arms, gear teeth integral with said arms at their inner ends, a fixed rigid support for said arms constituting journal bearings about which said gear teeth rotate to cause traversal of said arms through arcs, a worm gear for actuating said gear teeth, and a handle for manual rotation of said gear teeth, said arms being adapted to flex during actuation of said framework in accord with the angle of opening thereof.

6. In combination, a windshield frame adapted to swing to open and closed position about hinge means along the top thereof, an instrument panel extending downwardly from the bottom rail of said frame, a gear housing housed by said panel, a gear journalled in said housing and having a tool receiving end, toggle arms having gear teeth associated therewith journalled in said housing, said housing and gear being substantially below the bottom of said frame, said toggle arms and their gear teeth being angularly disposed with respect to said gear to connect said gear and said toggle arms, and a tool or handle insertable substantially horizontally through said panel for engagement with the tool receiving end of said gear.

REX C. JACOBS.